Patented Aug. 13, 1929.

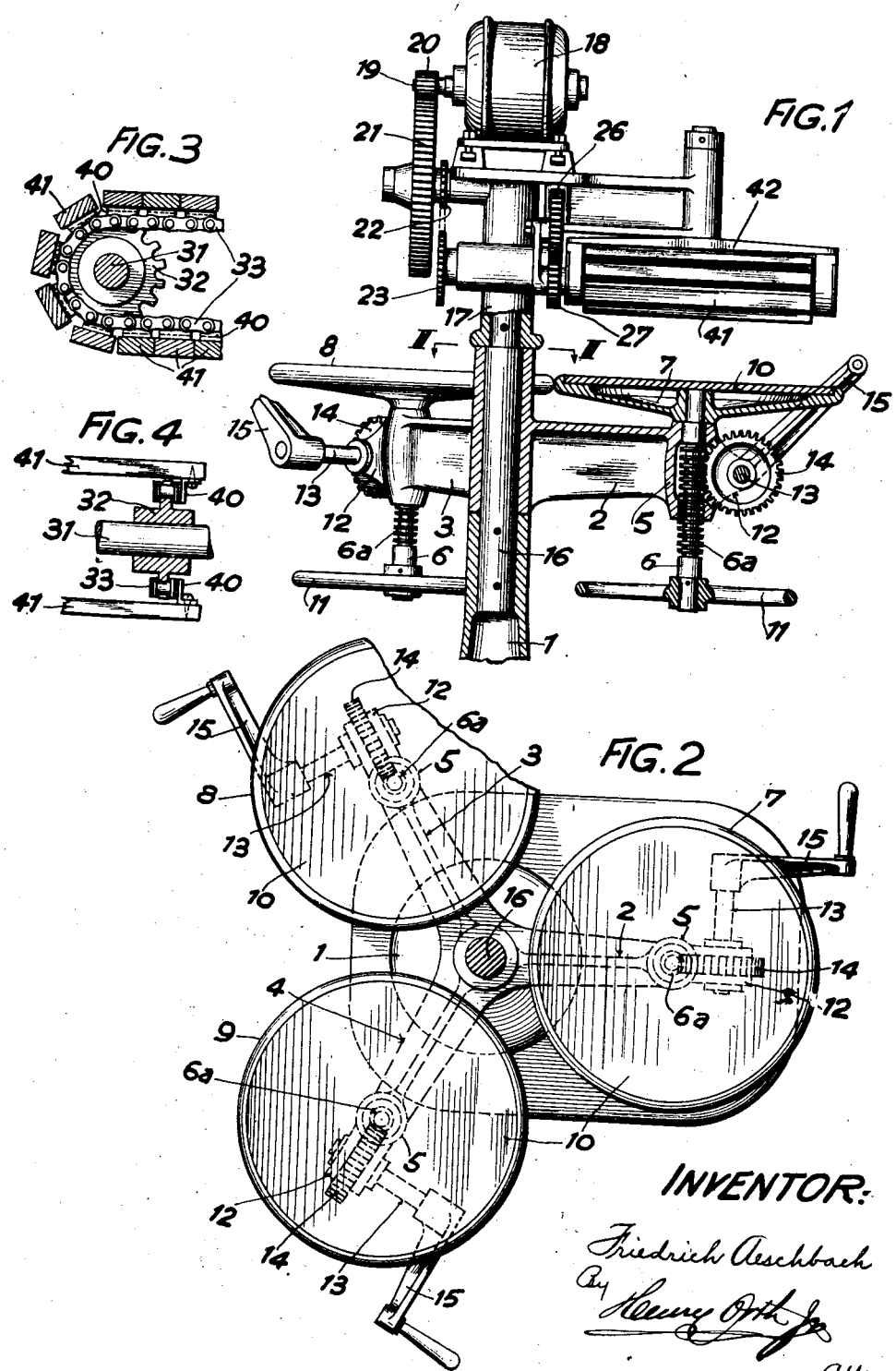

1,724,817

UNITED STATES PATENT OFFICE.

FRIEDRICH AESCHBACH, OF AARAU, SWITZERLAND.

MACHINE FOR SHAPING PIECES OF DOUGH.

Original application filed June 14, 1928, Serial No. 285,329, and in Switzerland April 17, 1928. Divided and this application filed March 26, 1929. Serial No. 350,023.

The present invention relates to improvements in machines for shaping pieces of dough and is a division of application Ser. No. 285,329, filed June 14, 1928.

According to the present invention the machine is provided with an endless shaping band and at least one shaping table turnable about a vertical axle for shaping pieces of dough placed between band and table, means being provided to adjust the height of the tables and thereby the distance between band and table.

A constructional example of the subject matter of the present invention is illustrated on the accompanying drawings, in which Fig. 1 is a side elevation with parts shown in a vertical section, Fig. 2 is a section along line II—II of Fig. 1, and Figs. 3 and 4 show a detail.

Referring now to the drawings, 1 denotes a standard on which three horizontal arms 2, 3, 4 arranged as a spider are turnably mounted and at the end of each arm a vertical bearing 5 is provided. In the bearings 5 axles 6 are mounted, which carry at their upper ends disks 7, 8 and 9 provided with plates or tables 10 made, for instance, of wood. At the lower end of each axle 6 a hand wheel 11 is arranged which serves to turn or oscillate the table 10 during the shaping operation. On a gudgeon 16 fixed in the standard 1 the upper part 17 of the machine is carried, having at its top an electric motor 18.

The shaping band is formed by wooden slabs 41 fixed to angular parts 40 on the endless chains 33 and is driven by the electric motor 18 in the manner described in the copending application Ser. No. 285,329, filed June 14, 1928. Of this drive the pinion 20 on the motor shaft 19 and in mesh with the gear wheel 21, the chain wheels 22, 23, gear wheels 26, 27 and chain wheel 32 on the shaft 31 are shown in the drawing. The shaping band is mounted in a frame 42 carried in the upper part 17 of the standard 1.

In order to adjust the distance between the shaping band and the tables every table 7–9 is individually and vertically adjustable. To this end the axles 6 to which the tables are fixed are provided with circumferential grooves in the part $6^a$ and are slidingly mounted in the bearings 5. The latter are provided with a lateral bearing 12 in which an axle 13 is mounted and a pinion 14 as well as a crank 15 are fixed to the axle 13. Each pinion 14 cooperates with circumferential grooves of its axle 6 so that by a turning of the crank 15 every table 7–9 with its plate 10 may be adjusted in its distance from the nonadjustable band.

By turning the spider frame 2, 3, 4 about the gudgeon 16 the tables 10 may be brought one after the other into the position below the shaping band. In this manner on one table the piece of dough to be shaped may be placed, whilst on the second table which is below the band the piece of dough is being acted upon and shaped in a known manner, the table being simultaneously turned or oscillated by means of the hand wheel and from the third table the finished shaped product can be removed. Thus a practically uninterrupted shaping action is obtained.

By a suitable turning to and fro of the hand-wheel 11 cylindrical dough pieces or pieces shaped as loaves or balls may be obtained. The arrangement of a plurality of tables cooperating with one shaping band ensures a continuous work of the machine.

I claim:

1. A machine for shaping pieces of dough, comprising in combination, an endless shaping band, means for driving said band, a plurality of shaping tables turnable about vertical axles, said axles being mounted in a device turnable about a vertical axle to bring one table after the other into the operative position below the band, and means to adjust the distance between said band and said tables by adjusting the height of the latter.

2. A machine for shaping pieces of dough, comprising in combination, an endless shaping band, means for driving said band, a plurality of shaping tables turnable about vertical axles, a device turnable about a vertical axle, said axles of the shaping tables being turnably and axially displaceably mounted in said device, whereby one table after the other may be brought into the operative position below said shaping band, and means cooperating with said axles for vertically displacing the latter and thereby adjusting the distance between said band and said tables.

3. A machine for shaping pieces of dough, comprising in combination, an endless shaping band, means for driving said band, a plurality of shaping tables turnable about vertical axles, a device turnable about a vertical axle, said axles of the shaping tables being turnably and axially displaceably mounted in said device, whereby one table after the other may be brought into the operative position below said shaping band, said axles of the tables being provided with circumferential notches, a gear wheel cooperating with the notches of the axle, and a crank for turning said gear wheel for vertically displacing said axles and thereby adjusting the distance between said band and said tables.

In testimony whereof I have signed my name to this specification.

FRIEDRICH AESCHBACH.